G. R. McIlroy,
Portable Fence,
N.º 16,598.                  Patented Feb. 10, 1857.
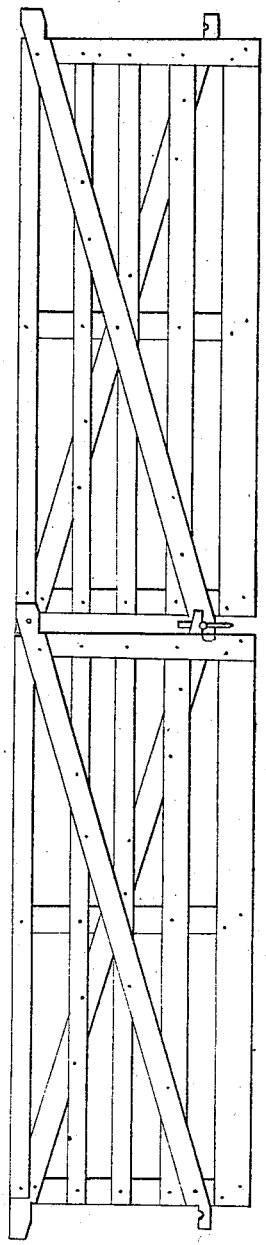
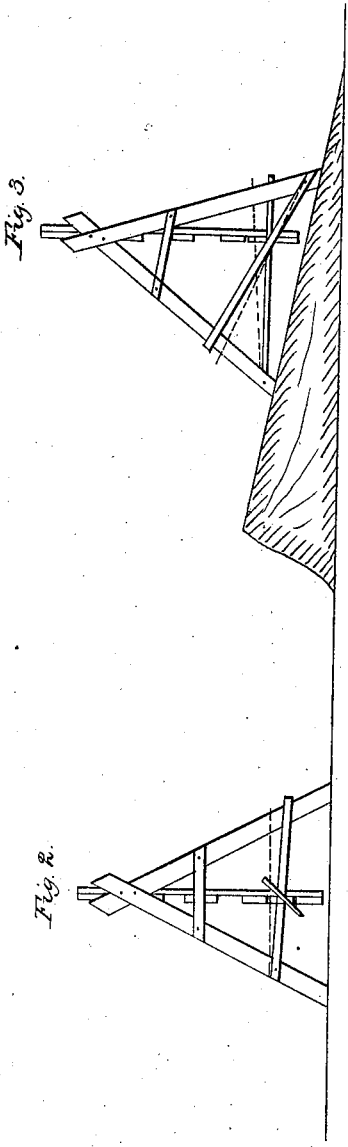

UNITED STATES PATENT OFFICE.

G. R. McILROY, OF COVINGTON, KENTUCKY.

FENCE ADAPTABLE TO UNEVEN GROUND.

Specification of Letters Patent No. 16,598, dated February 10, 1857.

*To all whom it may concern:*

Be it known that I, G. R. McILROY, of Covington, in the county of Kenton, in the State of Kentucky, have invented a new and Improved Mode of Constructing Portable Hillside-Fences; and I do hereby declare that the following is a full, clear, and exact description of the same, reference being had to the accompanying drawings and the figures of reference marked thereon.

The nature of my invention consists in an angular cross bar or batten fence composed of the following parts.

No. 1, is a side view of the sections or panels put together showing the cross bar or batten in place. No. 2 is the bearer with adjustable bar and oblique pin for even (or uneven) ground. No. 3, the bearer with two adjustable bars for uneven ground. Nos. 2 and 3 being end views.

To enable others skilled in the art to make and use my invention I will proceed to describe its construction and operation.

I construct my fence in any of the known forms and apply angular cross bars or battens with notches in the lower end of the cross bar or batten with adjustable bars and oblique pins.

Figure 1, is a side view, of panels with angular cross bar or batten with notches cut in the lower edge of the cross bar or batten and the upper cross bar or batten with holes for pins to pass through for fastening the same as a substantial bearing as seen at Figs. 2 and 3, on which to support the cross bar or batten and panel with the adjustable bar on the bearer in a manner that will allow of their being moved sidewise at bottom sufficiently to bring them perpendicular upon uneven ground, No. 2, is the bearer with adjustable bar at the bottom and oblique pin fastened through the same for even ground. No. 3 is the bearer with two adjustable bars and oblique pin for even or uneven ground in combination with the angular cross bar or batten.

What I claim as my invention and desire to secure by Letters Patent is—

The combination of the adjustable bar and oblique pin with an angularly braced panel and bearer or any ordinary panel as seen in Figs. 2 and 3 on which the angular or other bar may be supported so that the panels may be moved sidewise at the bottom so as to bring them perpendicular upon uneven ground and secured in that position by one or two adjustable bars or seats substantially as described.

G. R. McILROY.

Attest:
JOHN S. HOLLINGSHEAD,
JOHNSON SIMONDS.